(12) United States Patent
Robbins et al.

(10) Patent No.: US 10,095,045 B2
(45) Date of Patent: Oct. 9, 2018

(54) WAVEGUIDE COMPRISING A BRAGG POLARIZATION GRATING

(71) Applicant: MICROSOFT TECHNOLOGY LICENSING, LLC, Redmond, WA (US)

(72) Inventors: Steven Robbins, Redmond, WA (US); Sihui He, Bellevue, WA (US); Eliezer Glik, Seattle, WA (US); Xinye Lou, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/262,282

(22) Filed: Sep. 12, 2016

(65) Prior Publication Data

US 2018/0074340 A1 Mar. 15, 2018

(51) Int. Cl.
*G02B 27/42* (2006.01)
*G02B 6/10* (2006.01)
(Continued)

(52) U.S. Cl.
CPC ....... *G02B 27/4261* (2013.01); *G02B 5/1833* (2013.01); *G02B 6/105* (2013.01);
(Continued)

(58) Field of Classification Search
CPC ............ G02B 27/0172; G02B 27/0101; G02B 27/4261; G02B 27/0081; G02B 27/0927;
(Continued)

(56) References Cited

U.S. PATENT DOCUMENTS 5,157,537 A * 10/1992 Rosenblatt ................ G02F 1/01
359/245
5,337,183 A * 8/1994 Rosenblatt ................ G02F 1/01
359/245
(Continued)

FOREIGN PATENT DOCUMENTS

CN 104035157 A 9/2014
CN 104280885 A 1/2015
(Continued)

OTHER PUBLICATIONS

Okayama, et al., "Polarization rotation Bragg grating using Si wire waveguide with non-vertical sidewall", In Journal of Optics Express, vol. 22, Issue 25, Dec. 11, 2014, pp. 31371-31378.
(Continued)

*Primary Examiner* — Akm Enayet Ullah
(74) *Attorney, Agent, or Firm* — Arent Fox LLP

(57) ABSTRACT

An optical waveguide, for use a near-eye or heads-up display system, includes an input-coupler, an intermediate-component and an output-coupler. The input-coupler is configured to couple light corresponding to an image that is incident on the input-coupler, into the optical waveguide and towards the intermediate-component. The intermediate-component can be implemented as a Bragg polarization grating that comprises a stack of birefringent layers configured to diffract the light corresponding to the image that is incident thereon into a zero-order beam having one of right handed circular polarization or left handed circular polarization, and a first-order beam having the other one of right handed circular polarization or left handed circular polarization. The output-coupler is configured to couple, out of the optical waveguide, the light corresponding to the image that travels in the optical waveguide from the input-coupler
(Continued)

to the output-coupler via the intermediate-component by way of total internal reflection (TIR).

20 Claims, 5 Drawing Sheets

(51) Int. Cl.
  *G02B 27/00* (2006.01)
  *G02B 5/18* (2006.01)
  *G02B 27/09* (2006.01)
  *G02B 27/01* (2006.01)
(52) U.S. Cl.
  CPC ..... *G02B 27/0081* (2013.01); *G02B 27/0101* (2013.01); *G02B 27/0927* (2013.01); *G02B 27/0944* (2013.01)
(58) Field of Classification Search
  CPC .. G02B 27/0944; G02B 6/105; G02B 6/0011; G02B 6/0033; G02B 5/1833; G02B 5/1814; G02B 5/1819
  See application file for complete search history.

(56) References Cited

U.S. PATENT DOCUMENTS

| | | | |
|---|---|---|---|
| 5,587,816 A | 12/1996 | Gunjima et al. | |
| 6,529,331 B2 | 3/2003 | Massof et al. | |
| 6,563,648 B2 | 5/2003 | Gleckman et al. | |
| 6,750,996 B2 | 6/2004 | Jagt et al. | |
| 7,206,107 B2 | 4/2007 | Levola | |
| 7,483,604 B2 | 1/2009 | Levola | |
| 7,724,442 B2 | 5/2010 | Amitai | |
| 7,764,413 B2 | 7/2010 | Levola | |
| 7,876,489 B2 | 1/2011 | Gandhi et al. | |
| 8,160,411 B2 | 4/2012 | Levola et al. | |
| 8,169,704 B2 | 5/2012 | Saito | |
| 8,233,204 B1* | 7/2012 | Robbins ............... | G02B 5/1828 345/7 |
| 8,314,993 B2 | 11/2012 | Levola | |
| 8,320,032 B2 | 11/2012 | Levola | |
| 8,411,365 B2 | 4/2013 | Saito | |
| 8,466,953 B2 | 6/2013 | Levola | |
| 8,508,848 B2 | 8/2013 | Saarikko | |
| 8,547,638 B2 | 10/2013 | Levola | |
| 8,593,734 B2 | 11/2013 | Laakkonen | |
| 8,654,420 B2 | 2/2014 | Simmonds | |
| 8,736,963 B2 | 5/2014 | Robbins et al. | |
| 8,749,890 B1 | 6/2014 | Wood et al. | |
| 8,755,113 B2* | 6/2014 | Gardner ............... | G02B 5/3058 359/352 |
| 8,773,599 B2 | 7/2014 | Saeedi et al. | |
| 8,885,254 B2 | 11/2014 | Saito et al. | |
| 8,903,207 B1 | 12/2014 | Brown et al. | |
| 8,913,324 B2 | 12/2014 | Schrader | |
| 8,934,171 B2 | 1/2015 | Desserouer | |
| 8,947,783 B2 | 2/2015 | Gupta et al. | |
| 8,989,535 B2 | 3/2015 | Robbins | |
| 9,097,890 B2 | 8/2015 | Miller et al. | |
| 9,124,066 B2 | 9/2015 | Sridharan et al. | |
| 9,164,290 B2 | 10/2015 | Robbins et al. | |
| 9,274,338 B2 | 3/2016 | Robbins et al. | |
| 9,494,799 B2 | 11/2016 | Robbins et al. | |
| 9,664,824 B2* | 5/2017 | Simmonds ........... | G02B 5/1828 |
| 9,766,464 B2* | 9/2017 | Poon .................. | G02B 27/0172 |
| 9,791,696 B2* | 10/2017 | Woltman ........... | G02B 27/0101 |
| 9,791,703 B1* | 10/2017 | Vallius .............. | H04N 13/044 |
| 2004/0184699 A1 | 9/2004 | Yeralan | |
| 2007/0188837 A1 | 8/2007 | Shimizu et al. | |
| 2009/0303599 A1 | 12/2009 | Levola | |
| 2010/0141868 A1 | 6/2010 | St. Hilaire et al. | |
| 2010/0321781 A1 | 12/2010 | Levola et al. | |
| 2011/0007241 A1 | 1/2011 | Hwang et al. | |
| 2011/0026892 A1* | 2/2011 | Lin ..................... | G02B 6/2726 385/131 |
| 2011/0096401 A1 | 4/2011 | Levola | |
| 2012/0092750 A1 | 4/2012 | Kroll et al. | |
| 2013/0250430 A1 | 9/2013 | Robbins et al. | |
| 2013/0314789 A1 | 11/2013 | Saarikko et al. | |
| 2014/0104665 A1 | 4/2014 | Popovich et al. | |
| 2014/0140653 A1 | 5/2014 | Brown et al. | |
| 2014/0140654 A1 | 5/2014 | Brown et al. | |
| 2014/0168260 A1 | 6/2014 | O'Brien et al. | |
| 2014/0240834 A1* | 8/2014 | Mason ............... | G02B 27/0081 359/567 |
| 2014/0300966 A1 | 10/2014 | Travers et al. | |
| 2015/0125109 A1 | 5/2015 | Robbins et al. | |
| 2015/0160529 A1 | 6/2015 | Popovich et al. | |
| 2015/0168802 A1 | 6/2015 | Bohn | |
| 2015/0219842 A1 | 8/2015 | Sqalli et al. | |
| 2015/0260994 A1 | 9/2015 | Akutsu et al. | |
| 2015/0268399 A1 | 9/2015 | Futterer | |
| 2015/0277116 A1 | 10/2015 | Richards et al. | |
| 2016/0033698 A1 | 2/2016 | Escuti et al. | |
| 2016/0320536 A1 | 11/2016 | Simmonds et al. | |

FOREIGN PATENT DOCUMENTS

| | | |
|---|---|---|
| GB | 2521535 A | 6/2015 |
| WO | 2006064334 A1 | 6/2006 |
| WO | 2014056631 A1 | 4/2014 |
| WO | 2014080155 A1 | 5/2014 |
| WO | 2014091204 A1 | 6/2014 |
| WO | 2016020643 A1 | 2/2016 |

OTHER PUBLICATIONS

"Waveguide-based Displays Maturing for Augmented Reality Applications", Retrieved on: Apr. 18, 2016 Available at: http://www.displaydaily.com/articles/446-free-sponsored-contents/sponsored-articles/14132-waveguide-based-displays-maturing-for-augmented-reality-applications.

Ishiguro, et al., "Bragg-Type Polarization Gratings Formed in Thick Polymer Films Containing Azobenzene and Tolane Moietie", In Journal of Langmuir, vol. 23, Issue 1, Sep. 9, 2006, pp. 1-2.

"SBG Labs Delivers Transparent Display with Large Exit Pupil and Wide FOV for HMDS", Retrieved from <<https://www.digilens.com/press-release/sbg-labs-delivers-transparent-display-with-large-exit-pupil-and-wide-field-of-view-for-head-mounted-displays/>>, Dec. 2, 2012, 5 pages.

"Ex Parte Quayle Action Issued in U.S. Appl. No. 15/097,661", dated Apr. 4, 2017, 7 Pages.

"Notice of Allowance Issued in U.S. Appl. No. 15/097,661", dated Jun. 12, 2017, 9 pages.

"Non-Final Office Action Issued in U.S. Appl. No. 15/097,929", dated Oct. 16, 2017, 25 Pages.

Ayras, "Exit Pupil Expander with a Large Field of View Based on Diffractive Optics", In Journal of the Society for Information Display, vol. 17, Issue 8, Aug. 2009, 1 Page.

Davidson, et al., "Diffractive Elements for Annular Laser Beam Transformation", In Journal of Applied Physics Letters, vol. 61, Issue 4, Jul. 27, 1992, pp. 381-383.

Han, et al., "Portable Waveguide Display System with a Large Field of View by Integrating Freeform Elements and Volume Holograms", In Journal of Optics Express, vol. 23, No. 3, Feb. 9, 2015, pp. 3534-3549.

Kiyokawa, Kiyoshi, "A Wide Field-of-view Head Mounted Projective Display using Hyperbolic Half-silvered 5 Mirrors", In Proceedings of the 6th IEEE and ACM International Symposium on Mixed and Augmented Reality, Nov. 13, 2007, 4 Pages.

Kress, et al., "Diffractive and Holographic Optics as Optical Combiners in Head Mounted Displays", In Proceedings of the ACM Conference on Pervasive and Ubiquitous Computing Adjunct Publication, Sep. 8, 2013, pp. 1479-1482.

Levola, Tapani, "Invited paper: Diffractive Optics for Virtual Reality Displays", In Proceedings of the Twenty-Fifth International Display Research Conference, Jan. 1, 2005, vol. 2005, pp. 542-545.

(56) References Cited

OTHER PUBLICATIONS

"International Search Report and Written opinion Issued in PCT Application No. PCT/US2017/026254", dated Jul. 6, 2017, 14 pages.

Rolland, et al., "Head-Mounted Display Systems", In Encyclopedia of Optical Engineering, Mar. 2005, 14 Pages.

Urey, Hakan, "Diffractive Exit-Pupil Expander for Display Applications", In Journal of Applied Optics, vol. 40, Issue 32, Nov. 10, 2001, 12 Pages.

* cited by examiner

WAVEGUIDE COMPRISING A BRAGG POLARIZATION GRATING

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

SUMMARY

Certain embodiments of the present technology relate to an optical waveguide for use a near-eye or heads-up display system. The optical waveguide includes an input-coupler, an intermediate-component and an output-coupler. The input-coupler is configured to couple light corresponding to an image that is incident on the input-coupler into the optical waveguide and towards the intermediate-component. In accordance with certain embodiments, the intermediate-component is implemented as a Bragg polarization grating that comprises a stack of birefringent layers that is configured to diffract the light corresponding to the image that is incident thereon into a zero-order beam having one of right handed circular polarization or left handed circular polarization, and a first-order beam having the other one of right handed circular polarization or left handed circular polarization. Further, the stack of birefringent layers of the intermediate-component is configured to have a relatively high diffractive efficiency for light within an angle of incidence range having one of right handed circular polarization or left handed circular polarization, and have a relatively low diffractive efficiency for light within the angle of incidence range having the other one of right handed circular polarization or left handed circular polarization. The output-coupler is configured to couple, out of the optical waveguide, the light corresponding to the image that travels in the optical waveguide from the input-coupler to the output-coupler via the intermediate-component by way of total internal reflection (TIR).

Other embodiments of the present technology relate to a near-eye or heads-up display system that includes a display engine and an optical waveguide, such as the optical waveguide summarized above. Still other embodiments of the present technology related methods, for use with a near-eye or heads-up display system including an optical waveguide, wherein the methods use an optical waveguide to replicate an image associated with an input-pupil to an output-pupil. Such an optical waveguide includes an input-coupler, an intermediate-component and an output-coupler, and can be configured in the manner summarized above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is used to explain how specific embodiments described herein can be used to compensate for, reduce the amount of and/or mitigate the adverse effects of the multiple-loop interference.

DETAILED DESCRIPTION

Figure 1:
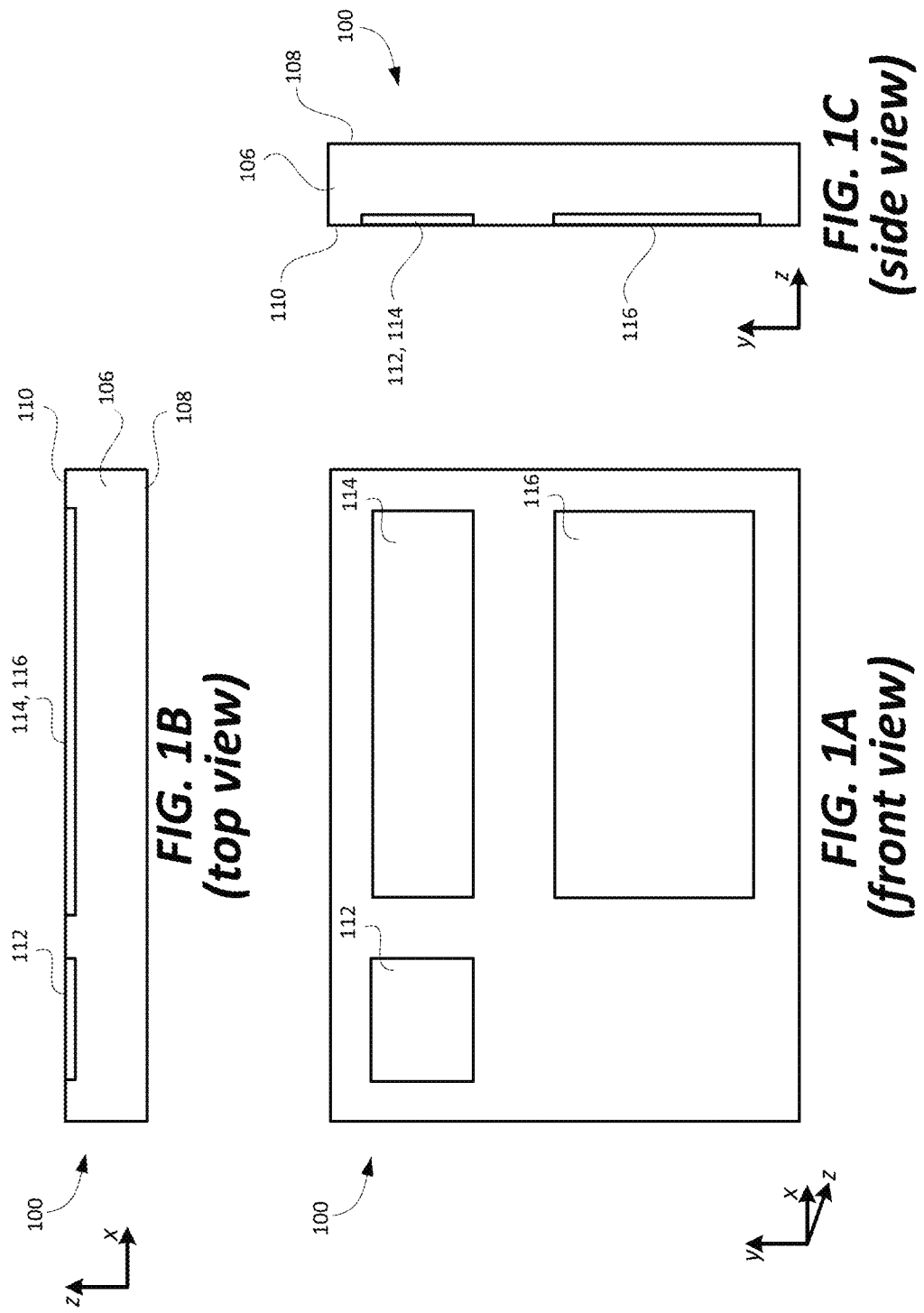
FIGS. 1A, 1B and 1C are front, top and side views, respectively, of an exemplary waveguide that can be used to replicate an image associated with an input-pupil to an expanded output-pupil.

Certain embodiments of the present technology relate to apparatuses for use in replicating an image associated with an input-pupil to an output-pupil. Such apparatuses can include a waveguide. As will be discussed in further details below, where waveguides are used to perform pupil replication (also referred to as image replication), non-uniformities in local and global intensities may occur, which may result in dark and light fringes and dark blotches when the replicated image is viewed, which is undesirable. Certain embodiments described herein can be used to improve intensity distributions, and thereby, can be used to improve the replicated image when viewed.

In the description that follows, like numerals or reference designators will be used to refer to like parts or elements throughout. In addition, the first digit of a three digit reference number, or the first two digits of a four digit reference number, identifies the drawing in which the reference number first appears.

FIGS. 1A, 1B and 1C are front, top and side views, respectively, of an exemplary optical waveguide 100 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. An input-pupil is sometimes also referred to as an entrance-pupil, and an output-pupil is sometimes also referred to as an exit-pupil. The optical waveguide 100 will often be referred to hereafter more succinctly simply as a waveguide 100. As will be discussed in further detail below with reference to FIG. 2, the image that the waveguide 100 is being used to replicate, and likely also expand, can be generated using a display engine.

Referring to FIGS. 1A, 1B and 1C, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 100 from the input-coupler 112 to the output-coupler 116, out of the waveguide 100 so that the light is output and viewable from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 108, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal reflection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where
  $\theta_c$ the critical angle for two optical mediums (e.g., the bulk-substrate 106, and air or some other medium that is adjacent to the bulk-substrate 106) that meet at a medium boundary,
  n1 is the index of refraction of the optical medium in which light is traveling towards the medium boundary (e.g., the bulk-substrate 106, once the light is couple therein), and
  n2 is the index of refraction of the optical medium beyond the medium boundary (e.g., air or some other medium adjacent to the bulk-substrate 106).

Figure 2:
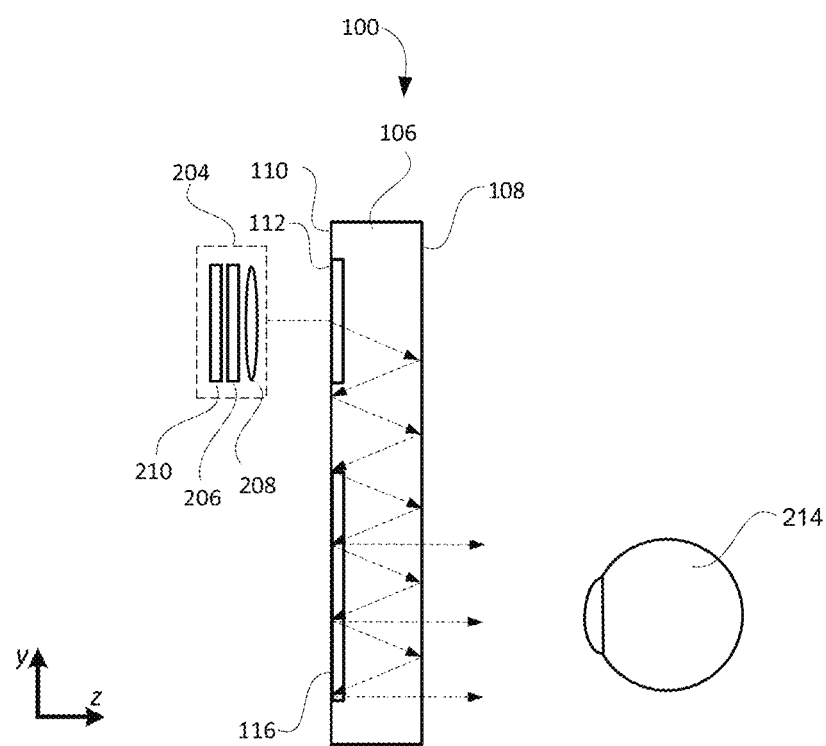
FIG. 2 is side view of the exemplary waveguide introduced with reference to FIGS. 1A, 1B and 1C, and also shows a display engine that generates an image including angular content that is coupled into the waveguide by an input-coupler, and also shows an eye that is viewing the image within an eye box that is proximate the output-coupler.

The concept of light traveling through the waveguide 100, from the input-coupler 112 to the output-coupler 114, by way of TIR, can be better appreciated from FIG. 2, which is discussed below. Referring now to FIG. 2, as in FIG. 1C, FIG. 2 shows a side view of the waveguide 100, but also shows a display engine 204 that generates an image including angular content that is coupled into the waveguide by the input-coupler 112. Also shown in FIG. 2, is representation of a human eye 214 that is using the waveguide 100 to observe an image, produced using the display engine 204, as a virtual image.

The display engine 204 can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin and Microoled provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an exit pupil associated with the image former 206, e.g., 5 mm or less in some embodiments, but is not limited thereto.

In FIG. 2, the display engine 204 is shown as facing the back-side surface 110 of the waveguide 100, and the eye 214 is shown as facing the front-side surface 108 opposite and parallel to the back-side surface 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major planar surface (108 or 110).

The waveguide 100 can be incorporated into a see-through mixed reality display device system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

Figure 3:
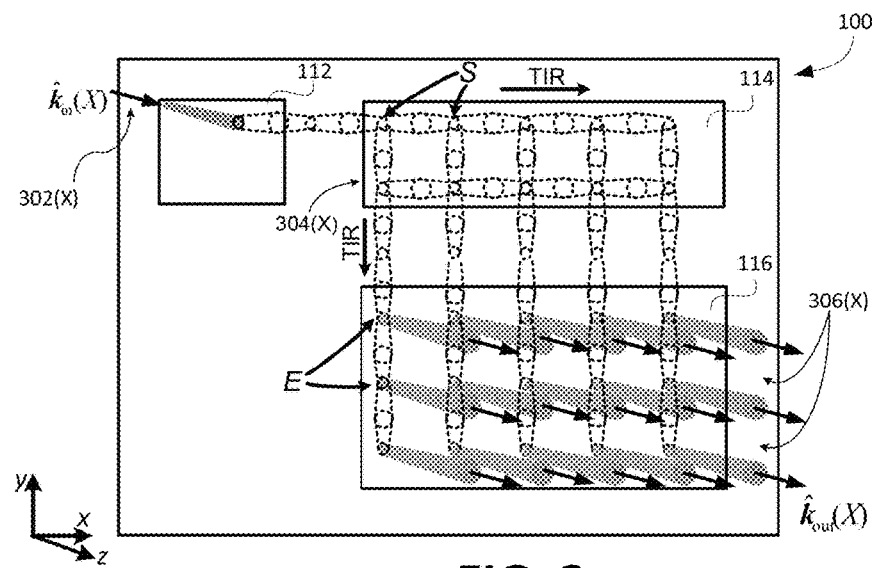
FIG. 3, which is similar to FIG. 1A because it provides a front view of the waveguide, is used to explain how light that is coupled into the waveguide by an input-coupler, travels by way of total internal reflection (TIR) from the input-coupler to an intermediate-component, and by way of TIR from the intermediate-component to an output-coupler, where it exits the waveguide.

FIG. 3, which is similar to FIG. 1A in that it provides a front view of the waveguide 100, will now be used to explain how light that is coupled into the waveguide 100 by the input-coupler 112, can travel by way of TIR from the input-coupler 112 to the intermediate-component 114, and by way of TIR from the intermediate-component 114 to the output-coupler 116, where it exits the waveguide 100. More specifically, as explained in more detail below, a combination of diffractive beam splitting and TIR within the waveguide 100 results in multiple versions of an input beam of light 302(X) being outwardly diffracted from the output-coupler 116 in both the length and the width of the output-coupler 116 as output beams 306(X) in respective outward directions (that is, away from the waveguide 100) that substantially match the respective inward direction $\hat{K}_{in}(X)$ of the corresponding input beam 302(X).

In FIG. 3, beams external to (e.g., entering or exiting) the waveguide 100 are represented using shading and dotted lines are used to represent beams within (i.e., internal to) the waveguide 100. Perspective is used to indicate propagation in the z-direction (i.e., towards or way from a user), with widening of the beams in FIG. 3 representing propagation in the positive z (i.e., +z) direction (that is towards the user). Thus, diverging dotted lines represent beams within the waveguide propagating towards the front-side major surface 108 of the waveguide 100, with the widest parts (shown as large dotted circles) representing those beams striking the front-side major surface 108 of the waveguide 100, from which they are totally internally reflected back towards the back-side major surface 110 of the waveguide 100, which is represented by the dotted lines converging from the widest points to the narrowest points (shown as the small dotted circles) at which they are incident on the back-side major surface 110 of the waveguide 100.

Exemplary regions where a beam is incident on the intermediate-component 114 and splits into two beams, one of which travels in the horizontal direction and the other one of which travels in the vertical direction, are labeled S (for split or splitting). Exemplary regions where a beam is incident on the output-coupler 116 and exits the waveguide 100 are labeled E (for exit or exiting).

As illustrated, the input beam 302(X) is coupled into the waveguide 100, e.g., by way of diffraction, by the input-coupler 112, and propagates along a width of the input-coupler by way of TIR in the horizontal (+x) direction. This results in the beam 302(X) eventually striking the intermediate-component 114 at a left-most splitting region (S).

When the beam 302(X) is incident at the left-most splitting region (S), that incident beam 302(X) is effectively split in two, e.g., by way of diffraction. This splitting creates a new version of that beam 304(X) (specifically a first-order diffraction mode beam) which is directed in a generally downwards vertical (−y) direction towards the output-coupler 116, in addition to a zero-order diffraction mode beam (i.e. unaffected by the diffractive component) that continues to propagate along the width of the intermediate-component 114 in the horizontal (+x) direction, just as the beam would in the absence of the intermediate-component 114 (albeit at a reduced intensity). Thus, a portion of the beam effectively continues to propagate along substantially the whole width of the intermediate-component 114, striking the intermediate-component 114 at various splitting regions (S), with another new version of the beam (in the same downward direction) created at each splitting region (S). As shown in FIG. 3, this results in multiple versions of the beam being directed toward, and incident on, the output-coupler 116, with the multiple versions of the beam being horizontally separated so as to collectively span substantially the width of the output-coupler 116. The zero-order diffraction mode beam can also be referred to more succinctly as a zero-order beam or a zero-order diffraction. Similarly, the first-order diffraction mode beam can also be referred to more succinctly as a first-order beam or a first-order diffraction. The horizontal direction can also be referred to as the sideways direction. The downwards vertical (−y) direction can also be referred to more succinctly as the downward direction.

As also shown in FIG. 3, each new version of the beam as created at a splitting region (S) may itself strike the intermediate-component 114 (e.g., a fold grating) during its downward propagation. This can result in a splitting of the new version of the beam, e.g., by way of diffraction, to create a further new version of that beam that is directed in a horizontal (+x) direction (which is a first-order reflection mode beam), in addition to a zero-order diffraction mode beam that continues to propagate in the downward vertical (−y) direction. This phenomenon may repeat numerous times within the waveguide, as can be appreciated from FIG. 3. FIG. 3 is not drawn to scale, as many more total internal reflections and splitting of beams are likely to occur than illustrated in FIG. 3, e.g., as can be better appreciated from FIG. 4, discussed below.

In FIG. 3, the output-coupler 116 is shown as being located below the intermediate-component 114, and thus, the downward-propagating versions of the beams will eventually be incident on the output-coupler 116, at which they are guided onto the various exit regions (E) associated with the output-coupler 116. The output-coupler 116 is configured so that when a version of the beam strikes the output-coupler, that beam is diffracted to create a first-order diffraction mode beam directed outwardly from the output-coupler 116, in an outward direction that substantially matches the unique inward direction in which the original beam 302(X) corresponding to an image point X was input. Because there are multiple versions of the beam propagating downwards that substantially span the height of the output-coupler 116, multiple output beams 306(X) are generated across the height of the output-coupler 116 (as shown in FIG. 3) to provide effective horizontal beam expansion, which can also be referred to as horizontal pupil expansion or horizontal pupil replication.

Moreover, the output-coupler 116 is configured so that, in addition to the outwardly diffracted beams 306(X) being created at the various exit regions (E) from an incident beam, a zero-order diffraction mode beam continues to propagate downwards in the same specific direction as that incident beam. This, in turn, strikes the output-coupler 116 at lower portions thereof in the manner illustrated in FIG. 3, resulting in both continuing zero-order and outward first-order beams. Thus, multiple output beams 306(X) are also generated across substantially the entire height of the output-coupler 116 to provide effective vertical beam expansion, which can also be referred to as vertical pupil expansion or vertical pupil replication.

The output beams 306(X) are directed outwardly in outward directions that substantially match the unique input direction in which the original beam 302(X) is inputted. In this context, substantially matching means that the outward direction is related to the input direction in a manner that enables a user's eye to focus any combination of the output beams 306(X) to a single point on the retina, thus reconstructing the image point X from which the original beam 302(x) propagated or was otherwise emitted.

For a planar waveguide (i.e., a waveguide whose front-side and back-side major surfaces lie substantially parallel to the xy-plane in their entirety), the output beams 306(S) are substantially parallel to one another and propagate outwardly in an output propagation direction $\hat{k}_{out}(X)$ that is parallel to the unique inward direction $\hat{k}_{in}(X)$ in which the corresponding input beam 302(X) was directed to the input-coupler 112. That is, directing the beam 302(X) corresponding to the image point X to the input-coupler 112 in the inward direction $\hat{k}_{in}(X)$ causes corresponding output beams 306(X) to be directed (e.g., diffracted) outwardly and in parallel from the output-coupler 116, each in an outward propagation direction $\hat{k}_{out}(X)=\hat{k}_{in}(X)$ due to the configuration of the waveguide 100.

In the exemplary implementation described above, the intermediate-component 114 (e.g., a fold grating) is configured to provide horizontal pupil expansion, also referred to as effective horizontal beam expansion; and the output-coupler 116 is configured to provide vertical pupil expansion, also referred to as effective vertical beam expansion. Alternatively, the intermediate-component 114 can be repositioned, e.g., below the input-coupler 112 and to the side of the output-coupler 116, and the components 112, 114 and 116 can be reconfigured such that the intermediate-component 114 is configured to provide vertical pupil expansion, and the output-coupler 116 is configured to provide horizontal pupil expansion, as was noted above. While there are significant benefits to performing horizontal (or vertical) pupil expansion using the intermediate-component 114, the various zero-order and first-order diffraction modes caused by the intermediate-component 114 result in multiple-loop interference, which is explained below with reference to FIG. 4.

Figure 4:
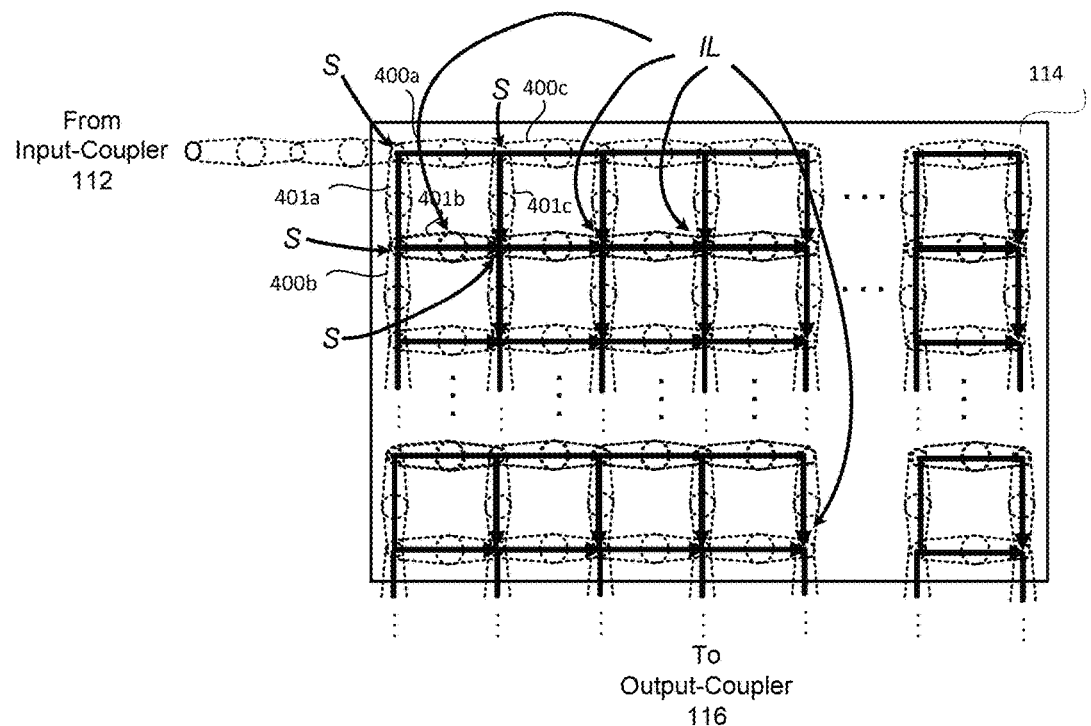
FIG. 4 conceptually illustrates how the intermediate-component of the exemplary waveguide, introduced in the earlier FIGS., can cause multiple-loop interference. Further.

FIG. 4 is illustrative of the intermediate-component 114 of the waveguide 100, but does not show other components of the waveguide, such as the input-coupler 112 and the output-coupler 116. Referring to FIG. 4, the dark lined loops shown therein, which are labeled IL, are illustrative of multiple interference loops that occur within the intermediate-component 114, which can collectively be referred to as multiple-loop interference. Each of the multiple interference loops is analogous to the type of interference that occurs using a Mach-Zehnder interferometer. In each interference loop IL, the positions where two arrow heads meet are illustrative of positions where zero-order and first-order reflections of an input beam (e.g., the input beam 302(X)) are incident on same locations of the intermediate-component 114 at a same time. Such dark lines with arrows are representative of pathways of light traveling within intermediate-component 114 of the waveguide 100. If the optical-length of each pathway (also known as an optical path length) were the same, then when the light beams traveling to the same point via different pathways are recombined they would add in a manner that results in constructive interference. More specifically, when beams of light from different paths have the same optical path lengths and the same polarization orientation and are imaged onto the same part of a retina of a human eye, the light constructively interferes and intensity is equal to the scalar sum of the beams.

For various reasons, the path lengths of light following different pathways from the input-coupler 112 to a same location on the intermediate-component 114 will actually be different, which can result in (total or partial) destructive interference, which causes the intensity of the light to diminish when imaged by a user's eye. This can occur, for example, because grating properties (e.g., grating depths) of the intermediate-component 114 may be purposely modulated in order to diffract a substantially same amount of light in the horizontal direction over an entirety of the intermediate-component 114. In a region of the intermediate-component closest to the input-coupler, a relatively small amount of light is preferably diffracted downward towards the output-coupler 116. Within the intermediate-component 114, as the distances increase from the input-coupler 112, the amount of light diffracted downward from the intermediate-component 114 towards the output-coupler 116 should gradually increase (e.g., by increasing the efficiency of the intermediate-component 114), because the amount of light still propagating sideways away from the input-coupler 112 gradually decreases with increases in distance from the input-coupler 112. This gradual change in the physical properties of the gratings of the intermediate-component 114 causes different phase shifts at the locations of the intermediate-component 114 where light traveling different pathways combine. Further, due to mechanical tolerances between the different pathways, the path length of the light following different pathways to a same location (on the intermediate-component 114) will most likely be different, which, as noted above, can result in (total or partial) destructive interference.

When beams of light from different paths have different optical path lengths and are imaged onto the same part of a retina of a human eye, the light destructively interferes and intensity is less than the scalar sum of the beams. Such destructive interference can cause dark fringes, and more generally, can cause a non-uniform intensity distribution in the light that eventually reaches the output-coupler 116 and exits the waveguide 100. More generally, the multiple-loop interference explained above, if not compensated for or mitigated, can cause variations in intensity that would be perceptible to a human eye viewing an image that is replicated using the waveguide, which is undesirable.

Depending on the orientation of the various components 112, 114 and 116 of the waveguide, these components may diffract light of incident polarization at different intensities. For example, there can be an approximately N-to-one (i.e., ~N:1) difference between orthogonal horizontal and vertical diffraction efficiency. If the incident polarization is not optimized for specific grating line orientations of the various components 112, 114 and 116 at certain angles, diffraction efficiency can suffer, which can cause dark areas to occur in an image that is replicated using the waveguide and being viewed by a human eye, which is undesirable.

The polarization of light specifies the orientation of the plane that the light wave's electric field oscillates in. Explained another way, the polarization of light is the state of its electric field vector (e-vector) orientation. Light can, for example, be non-polarized (a completely disordered, chaotic orientation of the e-vector), linearly polarized (e-vector oscillates in a plane that is constant), circularly polarized, or elliptical polarized. Linearly polarized light can be, e.g., horizontally polarized light or vertically polarized light, but is not limited thereto. Circularly polarized light can have a right handed circular polarization or a left handed circular polarization. The type of polarization that is ideal in an imaging system depends on many factors, including, e.g., the types and orientations of the optical components 112, 114 and 116.

In FIG. 4, exemplary zero-order beams are labeled 400a, 400b, 400c . . . etc. and exemplary first-order beams are labeled 401a, 401b, 401c . . . etc. As shown in FIG. 4, after a beam of light travels (sideways in FIG. 4) by way of TIR from the input coupler 112 (not shown in FIG. 4, but shown in FIG. 3) to the intermediate-component 114, the beam is split, by way of diffraction, into a zero-order beam 400a (that continues sideways) and a first-order beam 401a (that travels downward). The first-order beam 401a (that is traveling downward) is then split into a further zero-order beam 400b (that continues downward), and a further first-order beam 401b (the travels sideways). Similarly, the zero-order beam 400a (that is traveling sideways) is split into a further zero-order beam 400c (that continues sideways) and a further first-order beam 401c (that travels downward). Similarly, the zero-order beam 400b, the first-order beam 401b, the zero-order beam 400c, and the first-order beam 401c, are each slit into further zero-order and first-order beams, and so-on. As noted above, this results in multiple interference loops that are analogous to the type of interference that occurs using a Mach-Zehnder interferometer. Such interference loops, as mentioned above, if not compensated for or mitigated, can cause variations in intensity that would be perceptible to a human eye viewing an image that is replicated using the waveguide, which is undesirable.

The exemplary waveguide 100 shown in and described with reference to FIGS. 1-4 is for use in an imaging system that relies on pupil replication. In such systems, i.e., systems that rely on pupil replication, the output pupils are preferably uniformly overlapping for all angles. When this is not the case, e.g., because pupils are spaced too far apart from one another, angular-dependent spatial-non-uniformities in intensity arise, which manifest themselves as bright and dark image artifacts, which are undesirable.

Figure 5A:
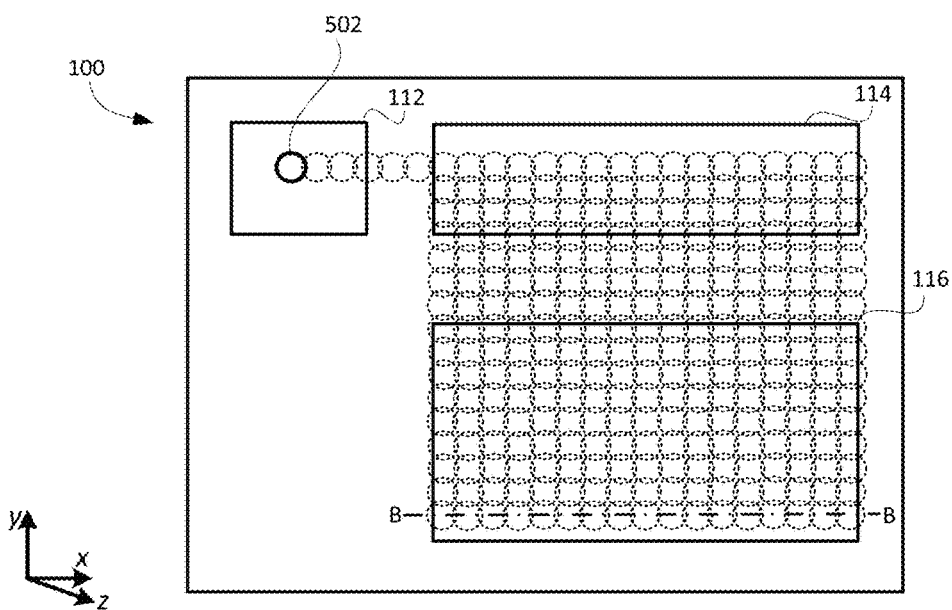
FIG. 5A is used to conceptually illustrate how a pupil is replicated within a waveguide.

FIG. 5A is used to conceptually illustrate how a pupil, represented by the solid-lined circle 502, is replicated, as light travels by way of TIR from the input-coupler 112 to the intermediate-component 114, and by way of TIR from the intermediate-component 114 to the output-coupler 116, where it exits the waveguide 100. In FIG. 5A, each of the dotted-lined circles represents a replication of the pupil 502, which may also be referred to simply as a pupil. While represented as circles in FIG. 5A, each pupil is actually a collection of angles. When light exits the waveguide 100, proximate the output-coupler 116, a human eye, which has a lens in it, receives the collection of angles associated with a pupil and coverts it back to an image, e.g., the image produced by the display engine 204 in FIG. 2. Where the waveguide 100, and more specifically the components 114 and/or 116 thereof is/are configured to perform pupil expansion, when an expanded pupil and is converted to an image (by the lens of a human eye), the resulting image is expanded relative to the original image (e.g., produced by the display engine 204 in FIG. 2).

Figure 5B:
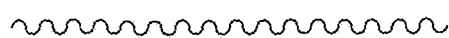
FIG. 5B illustrates an exemplary pupil distribution along the line B-B shown in FIG. 5A.
Figure 5C:
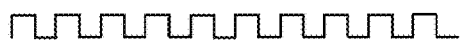
FIG. 5C illustrates an alternative pupil distribution, corresponding to a situation where there is no pupil overlap between pupils replicated within a waveguide.
Figure 5D:
FIG. 5D illustrates a substantially uniform pupil distribution.

FIG. 5B conceptually illustrates an exemplary pupil distribution along the dashed line B-B shown in FIG. 5A, which pupil distribution is shown as having a generally sinusoidal function, due to each pupil have a Gaussian intensity distribution and adjacent pupils only slightly overlapping one another. If the pupils were so spread apart that they did not overlap at all, and each of the pupils had a top-hat intensity distribution, then the pupil distribution can potentially have a square wave function, e.g., as shown in FIG. 5C, although a sinusoidal function (an example of which is shown in FIG. 5B) is more likely. Pupil distributions having a sinusoidal or square wave function will manifest themselves as bright and dark image artifacts, which are undesirable. Optimally, the pupils will overlap one another to achieve a uniform pupil distribution, which provides for a uniform intensity distribution function, as shown in FIG. 5D, which can be achieved, e.g., if there was a 50% overlap between pupils.

More generally, there is a desire to homogenize pupil overlap to provide a substantially uniform pupil distribution in the light traveling within the waveguide that is incident on the output-coupler 116.

Figure 6:
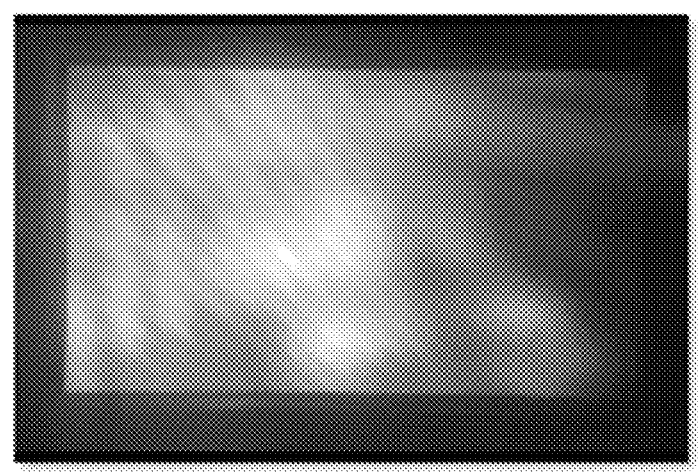
FIG. 6 is used to illustrate non-uniformities in local and global intensities which may occur when performing imaging, and more specifically pupil replication, using an optical waveguide.

FIG. 6 is used to illustrate that non-uniformities in local and global intensity which may occur when performing imaging using an optical waveguide, wherein the non-uniformities can occur due to multiple-loop interference, non-optimal polarization and/or non-uniform pupil distribution. More specifically, the dark and light generally diagonal fringes are illustrative of non-uniformities in local intensity that occur do to the pupil distribution being non-uniform, and the dark blotches (shown primarily on the right side) are illustrative of non-uniformities in local intensity that occur due to multiple-loop interference.

Embodiments of the present technology, which are described below, can be used to compensate for and/or mitigate multiple-loop interference, provide for more optimized polarization and/or provide for a more uniform pupil distribution. More generally, embodiments of the present technology, which are described below, are utilized to cause the light that is output from a waveguide (e.g., 100) by an output-coupler (e.g., 116) to have a more uniform intensity distribution, so that any non-uniformity in intensity is imperceptible to a human eye viewing an image using the waveguide.

More generally, embodiments of the present technology described herein can be used to achieve a substantially uniform intensity distribution in the light that exits a waveguide (e.g., 100) via an output-coupler (e.g., 116). A substantially uniform intensity distribution can be a substantially uniform angular intensity distribution, or a substantially uniform spatial intensity distribution, depending upon implementation. It is also possible that substantially uniform intensity distribution can be both a substantially uniform angular intensity distribution, and a substantially uniform spatial intensity distribution. A substantially uniform angular intensity distribution is especially beneficial in applications where the location of a user's eye(s) is/are fixed relative to the waveguide(s), e.g., in a head-mounted-display (HMD) or other near-eye-display (NED) application. A substantially uniform spatial intensity distribution is especially beneficial in applications where the location of a user's eye(s) is/are not fixed relative to the waveguide(s), e.g., in a heads-up-display (HUD) application. The overall goal of having the light, output by the waveguide, having a substantially uniform intensity distribution is so that any non-uniformity in intensity is imperceptible to a human eye viewing an image using the waveguide.

Without using embodiments of the present technology, or alternative techniques for compensating for non-uniform intensity distributions, the light that is output from a waveguide by an output-coupler will have a non-uniform intensity distribution that would be very noticeable to a human eye viewing an image that is reproduced using the waveguide. More specifically, certain portions of an image would appear significantly brighter than other portions, and certain portions of the image would appear significantly darker than other portions. An example of this can be appreciated from FIG. 6, discussed above.

The interference loops, which occur within an intermediate-component (e.g., 114), and which were described above with reference to FIG. 4, cause strong interference and are sensitive to manufacturing variations. Where the grating period over the intermediate-component (e.g., 114) is constant, which is typically the case, the optical path difference between the different parts of each of the interference loops is on the order of nanometers. This is within the coherent length of any potential LED light source, and therefore, the interference cannot be reduced by reducing the coherence length of the light, where the illuminator 210 includes one or more LED light sources. Further, the optical paths cannot be altered to go beyond the coherence length. Nevertheless, even though coherence cannot be reduced in the intermediate-component 114, the intermediate-component can be configured to reduce a quantity of the interference loops, reduce the extent of the destructive interference that is caused by the interference loops, and increase polarization diversity of the light corresponding to an image that travels through an optical waveguide from an input-coupler to an output-coupler, via the intermediate-component by way of TIR, and thereby provide for a more uniform intensity distribution, as will be described below.

As explained above with reference to FIG. 4, after a beam of light travels (sideways in FIG. 4) by way of TIR from the input coupler 112 (not shown in FIG. 4, but shown in FIG. 3) to the intermediate-component 114, the beam is split, by way of diffraction, into a zero-order beam 400a (that continues sideways) and a first-order beam 401a (that travels downward). The first-order beam 401a (that is traveling downward) is then split into a further zero-order beam 400b (that continues downward), and a further first-order beam 401b (the travels sideways). Similarly, the zero-order beam 400a (that is traveling sideways) is split into a further zero-order beam 400c (that continues sideways) and a further first-order beam 401c (that travels downward). Similarly, the zero-order beam 400b, the first-order beam 401b, the zero-order beam 400c, and the first-order beam 401c, are each slit into further zero-order and first-order beams, and so-on.

Still referring to FIG. 4, destructive interference may occur, for example, if a first pathway of light including the first-order beam 401b, and a second pathway of light including the first-order beam 401c, travel to a same location on the intermediate-component 114, with the first and second pathways of light having different optical path lengths, as was explained above. One way to mitigate such destructive interference is to reduce the intensity of, and preferably eliminate, the first-order beam 401b. This will have the effect of mitigating, and preferably eliminating, the interference loop that would otherwise be caused by the existence of the first-order beam 401b. This can theoretically be achieved by preventing the first-order beam 401a from splitting into the further zero-order and first-order beams 400b and 401b. More specifically, the desire is for the first-order beam 401a to only continue downward towards the output-coupler 116, and thus, for the first-order beam 401a to have little effective diffraction efficiency, thereby minimizing the first-order term of this interaction. While it may not be possible to completely prevent the first-order beam 401a from splitting into further zero-order and first-order beams 400b and 401b, appropriate design of the intermediate-component 114 can cause the intensities of the split beams to be different from one another, and more specifically, can cause the zero-order beam 400b (traveling downward towards the output coupler 116) to have a significantly greater intensity than the first-order beam 401b (that travels sideways). In accordance with specific embodiments, the intermediate-component 114 is designed to cause the intensity of the zero-order beam 400b (traveling downward towards the output coupler 116) to be at least one order of magnitude greater than (i.e., at least 10×) the intensity of the first-order beam 401b (that travels sideways). One way to cause the intensity of the zero-order beam 400b (traveling downward towards the output coupler 116) to be at least one order of magnitude greater than (i.e., at least 10×) the intensity than the first-order beam 401b (that travels sideways) is to implement the intermediate-component 114 using a stack of birefringent layers, as described below.

In accordance with specific embodiments of the present technology, the intermediate-component 114 of the optical waveguide 100 is implementing using a stack of birefringent layers that is configured to diffract the light corresponding to an image that is incident thereon into a zero-order beam having one of right handed circular polarization or left handed circular polarization, and a first-order beam having the other one of right handed circular polarization or left handed circular polarization. More specifically, the intermediate-component 114 can be implemented as a Bragg polarization grating that is configured to have the above noted properties. Further, the intermediate-component 114 is configured to have a relatively high diffractive efficiency for light (within an angle of incidence range) having one of right handed circular polarization or left handed circular polarization, and have a relatively low diffractive efficiency for light (within the angle of incidence range) having the other one of right handed circular polarization or left handed circular polarization. Such an intermediate-component can reduce a quantity of the interference loops that were described above with reference to FIG. 4. Further, such an intermediate-component can reduce the extent of the destructive interference that is caused by the interference loops. Additionally, such an intermediate-component can increase polarization diversity of the light corresponding to an image that travels through an optical waveguide from an input-coupler to an output-coupler, via the intermediate-component, by way of TIR. This will beneficially have the effect of providing for a more uniform intensity distribution in the light corresponding to an image that is eventually out-coupled by the output-coupler (e.g., 116) of the optical waveguide (e.g., 100), which is desirable.

The specific angle of incidence range is associated with the angles at which light travels within the waveguide by way of TIR, and thus, depends on many factors, such as, the thickness of the optical waveguide, the index of refraction of the optical medium from which the optical waveguide is manufactured, and the wavelength of the light traveling through the waveguide, just to name a few. However, for the sake of providing an example, an exemplary angle of incidence range can be from 40 to 80 degrees relative to the normal of the major surfaces (e.g., 110 and 108) of the optical waveguide (e.g., 100), or between 45 to 55 degrees relative to the normal of the major surfaces (e.g., 110 and 108) of the optical waveguide (e.g., 100). Other angle of incidence ranges are possible, and within the scope of the embodiments described herein.

Assume, for example, that the intermediate-component 114 is implemented using a stack of birefringent layers that is configured to diffract light incident thereon (after traveling from the input-coupler 112 to the intermediate component 114) into a zero-order beam (e.g., 400a) having right handed circular polarization, and a first-order beam (e.g., 401a) having left handed circular polarization. Also assume that the intermediate-component 114 is configured to have a relatively high diffractive efficiency for light (within an angle of incidence range) having right handed circular polarization, and have a relatively low diffractive efficiency for light (within the angle of incidence range) having left handed circular polarization. The relatively high diffractive efficiency (for light within the angle of incidence range) can be, for example, at least one order of magnitude greater than (i.e., at least 10×) the relative low diffractive efficiency (for light within the angle of incidence range), and can preferably be at least 15× greater.

In this example, the zero-order beam 400a (traveling sideways) that has right handed circular polarization, will be beneficially split into zero- and first-order beams 400c and 401c having similar intensities to one another, since the intermediate-component 114 is configured to have the relatively high diffractive efficiency for light (within the angle of incidence range) having right handed circular polarization. The zero-order beam 400c, which continues traveling sideways, will have the same polarization as the zero-order beam 400a, which is right handed circular polarization in this example. The first-order beam 401a (traveling downward) that has left handed circular polarization, as a result of the configured intermediate-component 114, will primarily continue downward in the zero-order direction, since the intermediate-component 114 is configured to have the relatively low diffractive efficiency for light (within the angle of incidence range) having left handed circular polarization. While a small amount of the first-order beam 401a (traveling downward) that has left handed circular polarization will be diffracted in the first-order direction (to the right) to produce the first-order beam 401b, in response to being incident on the intermediate-component 114, the intensity of the first-order beam 401b will be at least one-order of magnitude less than the intensity of the first-order beam 401c, such that when the beams 401b and 401c travel different path lengths to the same location on the intermediate-component 114, the beam 401b will cause negligible interference, thereby essentially eliminating the interference loop that could otherwise cause detrimental destructive interference. In this manner, it can be said that the intermediate-component is configured to reduce the quantity of the interference loops (ILs) that were described above with reference to FIGS. 3 and 4. Further, because the polarization of the zero- and -first order beams (that travel different path lengths to a same location on the intermediate-component 114) differ from one another, there is a reduction in an extent of destructive interference that is caused by interference loops.

In an alternative embodiment, the input-coupler, intermediate-component and output-coupler may be spatially rearranged relative to one another, and the intermediate-component can be implemented using a stack of birefringent layers that is configured to diffract light incident thereon (after traveling from the input-coupler to the intermediate component) into a zero-order beam having left handed circular polarization, and a first-order beam having right handed circular polarization. Additionally, in this alternative embodiment the intermediate-component can be configured to have a relatively high diffractive efficiency for light (within an angle of incidence range) having left handed circular polarization, and have a relatively low diffractive efficiency for light (within the angle of incidence range) having right handed circular polarization.

By implementing the intermediate-component as a Bragg polarization grating having one of the sets of properties described above, there is an increase in the polarization diversity of the light corresponding to an image that travels through the optical waveguide from the input-coupler 112 to the output-coupler 116 via the intermediate-component 114 by way of TIR. This advantageously provides for a more uniform intensity distribution, compared to if the intermediate component was not configured to diffract the light corresponding to the image that is incident thereon into a zero-order beam having one of right handed circular polarization or left handed circular polarization, and a first-order beam having the other one of right handed circular polarization or left handed circular polarization. To provide for good polarization diversity, the Bragg polarization grating of the intermediate-component 114 may be specifically configured to cause zero-order and first-order beams to each have an elliptical polarization with an ellipticity angle that changes in dependence on where an optical interaction occurs with the intermediate-component 114.

As was described above, e.g., with reference to FIGS. 1A, 1B and 1C, an optical waveguide 100 includes a bulk-substrate 106 having a first major surface 108 and a second major surface 110 opposite the first major surface 108. In accordance with an embodiment, where the intermediate-component 114 of the optical waveguide 100 is implemented as a Bragg polarization grating, the stack of birefringent layers of the Bragg polarization grating can be located on one of the first and second major surfaces 108, 110 of the bulk-substrate 106. In an alternative embodiment, the stack of birefringent layers of the Bragg polarization grating can be embedded between the first and second major surfaces 108, 110 of the bulk-substrate 106.

Polarization Gratings are diffractive optical elements formed by patterning thin films with optical anisotropy. A local optical axis of a polarization grating may vary linearly (e.g., $\varphi(x)=\pi x/\Lambda$) along a direction that is coplanar with the optical axis itself (e.g., XY plane), and may have a homogenous anisotropy magnitude, among other features. This may provide optical properties that may be unique to polarization gratings, including but not limited to high diffraction efficiency, limited diffraction orders, and/or polarization selectivity. Using photo-alignment and liquid crystal materials, polarization gratings having specific properties may be fabricated, e.g., using polymerizable liquid crystals. More specifically, a polarization grating may be formed using multiple layers of liquid crystals with a single alignment layer. By adding chiral dopants to reactive mesogens, also called low-molecular weight polymerizable liquid crystals (LCPs), a chiral twist in each layer may be achieved, with this chiral twist used to tailor the bandwidth of high diffraction efficiency.

The interaction of light with diffraction gratings can be affected by a complex combination of both material and geometric parameters. It is common in the field of diffraction gratings to use a dimensionless parameter Q to identify the regime of the optical behavior of a particular grating configuration: $Q=2\pi\lambda d/\Lambda^2 n$, where $\lambda$ is the vacuum wavelength of light, d is the grating thickness, $\Lambda$ is the grating period of the optical element (i.e., pitch), and n is the average refractive index. In this framework, the Bragg regime can be defined as $Q>1$, the Raman-Nath regime can be defined as $Q<1$, and $Q\sim 1$ may refer to a mixed regime with properties of both.

As described in U.S. patent application Ser. No. 14/831,660 to Escuti et al. (published as U.S. Patent Publication No. 2016/0033698 A1), an optical grating can be designed to have a grating period, thickness and average refractive index such that the Bragg condition ($Q>1$) is achieved for a wavelength (or wavelength range) of interest, which can also be referred to as the wavelength (or wavelength range) of operation. The wavelength range of operation can be, e.g., a red wavelength range, a green wavelength range or a blue wavelength range, but is not limited thereto.

A Bragg polarization grating can be fabricated, e.g., using holographic lithography methods that pattern a polarization grating alignment condition within a linearly photopolymerizable polymer (LPP) to define an optical element grating period sufficient such that the resulting liquid crystal polarization grating (LCPG) satisfies the Bragg condition ($Q>1$), using photo-alignment materials and liquid crystal materials, e.g., as described for example in U.S. Pat. No. 8,358,400 to Escuti et al. A spatially varying polarization pattern can be recorded by the LPP as an alignment direction. The light source used to record the polarization grating may be a highly coherent and collimated light source, or it may be partially coherent and/or partially collimated light source (e.g., high pressure lamp or light emitting diode (LED)), which is transmitted through a polarizer. Such light sources may emit at an ultraviolet (UV) wavelength, but this is not required. Holographic lithography, proximity lithography (also known as or holographic replication), or other techniques may be used for the patterning and fabrication of the Bragg polarization grating.

Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk liquid crystal often exhibits anisotropy in its physical properties, such as anisotropy in its mechanical, electrical, magnetic, and/or optical properties. As used herein, the liquid crystals can have a nematic phase, a chiral nematic phase, a smectic phase, a ferroelectric phase, and/or another phase. As a result of the rod-like or disk-like nature, the distribution of the orientation of liquid crystal molecules may play an important role in optical applications. In optical applications, liquid crystal alignment may be dictated by an alignment surface. The alignment surface may be treated so that the liquid crystal aligns relative to the surface in a controllable way. A number of photopolymerizable polymers may be used as alignment layers to create the polarization gratings described herein.

While not specifically shown in all of the above described figures, each of the optical waveguides described herein can be for use with a display engine, which can be the same as or similar to the display engine 204 described above with reference to FIG. 2, but is not limited thereto. For example, the display engine (e.g., 204) can face a back-side surface of one of the optical waveguide(s), and a user's eye (e.g., the eye of a person wearing HMD glasses) can facing a front-side surface opposite and parallel to the back-side surface, to provide for a periscope type of configuration in which light enters the waveguide on one side of the waveguide, and exits the waveguide at an opposite side of the waveguide. Alternatively, the input-coupler and the output-coupler can be implemented in a manner such that the display engine and a user's eye are proximate to and face a same major surface of the optical waveguide.

Where optical waveguides are used to perform pupil replication (also referred to as image replication), non-uniformities in local and global intensities may occur, which may result in dark and light fringes and dark blotches when the replicated image is viewed, which is undesirable. The embodiments shown in and described herein provide for improved intensity distributions, and thereby, can be used to improve the replicated image when viewed.

The optical waveguides described herein can be incorporated into a see-through mixed reality display device system. The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different colors (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

The optical waveguides described herein are for use in steering light from an input-coupler to an output-coupler, where the light is out-coupled for viewing or imaging by one of a person's two eyes (i.e., either their left or right eye). One or more further instances of the waveguide can be provided for the other eye. In other words, a separate instance of a waveguide described herein and the display engine 204 can be provided for each of the left and right eyes of a user. In certain embodiments, such waveguide(s) may be positioned next to or between see-through lenses, which may be standard lenses used in eye glasses and can be made to any prescription (including no prescription). Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

In the above described FIGS., the input-couplers, the intermediate-components and the output-couplers were are shown as having specific outer peripheral shapes, but can have alternative outer peripheral shapes. Similarly, the peripheral shape of the optical waveguides can also be changed, while still being within the scope of embodiments described herein.

Figure 7:
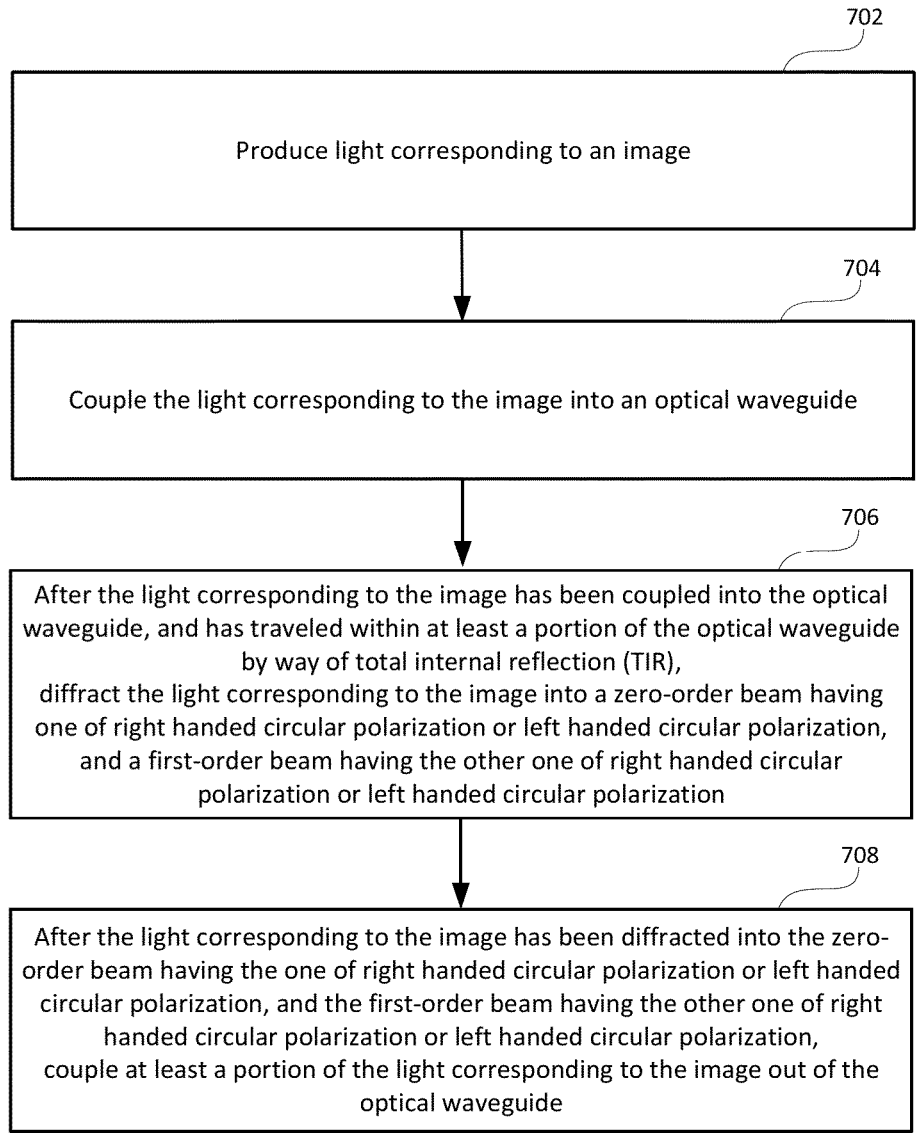
FIG. 7 is a high level flow diagram that is used to summarize methods according to certain embodiments of the present technology.

FIG. 7 is a high level flow diagram that is used to summarize methods according to certain embodiments of the present technology. Such methods, which can be for use with a near-eye or heads-up display system including an optical waveguide, can use the optical waveguide to replicate an image associated with an input-pupil to an output-pupil. Such an optical waveguide includes an input-coupler, an intermediate-component and an output-coupler.

Referring to FIG. 7, step 702 involves producing light corresponding to an image, and step 704 involves coupling the light corresponding to the image into an optical waveguide. In accordance with an embodiment, step 702 is performed using a display engine, which can be the same as or similar to the display engine 204 described above with reference to FIG. 2. In accordance with an embodiment, the coupling of the light corresponding to the image into optical waveguide at step 704 is performed using the input-coupler (e.g., 112) of the optical waveguide (e.g. 100).

Still referring to FIG. 7, step 706 involves, after the light corresponding to the image has been coupled into the optical waveguide, and has traveled within at least a portion of the optical waveguide by way of total internal reflection (TIR), diffracting the light corresponding to the image into a zero-order beam having one of right handed circular polarization or left handed circular polarization, and a first-order beam having the other one of right handed circular polarization or left handed circular polarization. In accordance with an embodiment, step 706 is performed using the intermediate-component (e.g., 114) of the optical waveguide (e.g., 100). Such an intermediate-component can be configured to have a relatively high diffractive efficiency for light within an angle of incidence range having one of right handed circular polarization or left handed circular polarization, and have a relatively low diffractive efficiency for light within the angle of incidence range having the other one of right handed circular polarization or left handed circular polarization.

Step 708 involves, after the light corresponding to the image has been diffracted into the zero-order beam having the one of right handed circular polarization or left handed circular polarization, and the first-order beam having the other one of right handed circular polarization or left handed circular polarization, coupling at least a portion of the light corresponding to the image out of the optical waveguide. In accordance with an embodiment, step 708 is performed using an output-coupler (e.g., 116) of the optical waveguide (e.g., 100).

In accordance with an embodiment, the intermediate-component that is used to perform step 706 can also be used to perform one of horizontal or vertical pupil expansion, and the output-coupler that is used to perform step 708 can be used to perform the other one of horizontal or vertical pupil expansion.

In accordance with an embodiment, such an intermediate-component is implemented using a stack of birefringent layers that is configured to diffract the light corresponding to the image that is incident thereon into the zero-order beam having the one of right handed circular polarization or left handed circular polarization, and the first-order beam having the other one of right handed circular polarization or left handed circular polarization. Further, the stack of birefringent layers is configured to have a relatively high diffractive efficiency for light within an angle of incidence range having one of right handed circular polarization or left handed circular polarization, and have a relatively low diffractive efficiency for light within the angle of incidence range having the other one of right handed circular polarization or left handed circular polarization. More specifically, the intermediate-component can be implemented as a Bragg polarization grating. Additional details of such an intermediate-component are described above.

Certain embodiments of the present technology described above implement an intermediate-component 114 of an optical waveguide 100 as Bragg polarization grating including a stack of birefringent layers that is configured in a specific manner to improve an intensity distribution of light that is eventually out-coupled by an output-coupler 116 of the optical waveguide 100. It would also be possible to implement the input-coupler and/or the output-coupler of such an optical waveguide as a Bragg polarization including a stack of birefringent layers. Further, it is noted that additional techniques may also be used, in combination with the techniques described above, to improve the intensity distribution of light that is eventually out-coupled by an output-coupler 116. For example, the input-coupler 112 and/or the output-coupler 116 can be implemented as a liquid crystal coating (LCP) based surface relief grating (SRG) that enables more control of the refraction/diffraction of light incident thereon, than compared to a conventional SRG. This is because different polarizations and angles of propagation will experience different indices of refraction of the LCP based SRG and could result in differences in diffraction efficiency and uniformity. An LCP coating is an optically anisotropic and birefringent material that has an index of refraction (also known as a refractive index) that depends on the polarization and propagation direction of light. More specifically, whereas an isotropic polymer coating has a uniform index of refraction in all directions, an anisotropic birefringent LCP coating has different indices of refraction along at least one axis of the material (one axis differs from the other two for uniaxial birefringent materials; and all three axis could be different for bi-axial birefringent materials).

The LCP in which SRG(s) is/are formed could be aligned through alignment layers or holographic techniques. For example, in certain embodiments, a combined nano-imprint lithography can be used to achieve a desired physical surface structure, and a holographic exposure can be used to achieve a desired liquid crystal alignment. Other implementations are also possible, and within embodiments of the present technology.

If orientated appropriately, an LCP based SRG can act like a wave retarder and rotate the polarization state of an incoming beam. For example, if the input-coupler 112 and the output-coupler 116 are both LCP based SRGs, where the output-coupler 116 has grating lines that are orthogonal to the input-coupler 112, this should increase the optical efficiency of the waveguide. Where the input-coupler 112 and/or the output-coupler 116 is/are an LCP based SRG, each such LCP based SRG can be formed on one of the major planar surfaces 108 or 110 of the bulk-substrate 106. It is also possible that one of the input-coupler 112 or the output-coupler 116 is an LCP based SRG formed on one of the major planar surfaces (e.g., 108) of the bulk-substrate 106, while the other one of the input-coupler 112 or the output-coupler 116 is an LCP based SRG formed on the other one of the major planar surfaces (e.g., 110) of the bulk-substrate 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    an optical waveguide comprising an input-coupler, an intermediate-component, an output-coupler, and a bulk-substrate having a first major surface and a second major surface opposite the first major surface; and
    a display engine configured to produce an image and to direct light corresponding to the image towards the input-coupler of the optical waveguide, wherein:
        the input-coupler is configured to couple light corresponding to the image, that is incident on the input-coupler, into the optical waveguide and towards the intermediate-component;
        the intermediate-component is configured to perform pupil expansion and direct the light corresponding to the image towards the output-coupler;
        the output-coupler is configured to couple, out of the optical waveguide, the light corresponding to the image that travels in the optical waveguide from the input-coupler to the output-coupler via the intermediate-component by way of total internal reflection (TIR); and
        the intermediate-component comprises a Bragg polarization grating comprising a stack of birefringent layers, the stack of birefringent layers being located on one of the first major surface or the second major or being embedded between the first major surface and the second major surface.

2. The system of claim 1, wherein the Bragg polarization grating is further configured to:
    diffract the light corresponding to the image that is incident thereon into a zero-order beam having one of right handed circular polarization or left handed circular polarization, and a first-order beam having the other one of right handed circular polarization or left handed circular polarization;
    have a relatively high diffractive efficiency for light within an angle of incidence range having one of right handed circular polarization or left handed circular polarization; and
    have a relatively low diffractive efficiency for light within the angle of incidence range having the other one of right handed circular polarization or left handed circular polarization.

3. The system of claim 2, wherein the relatively high diffractive efficiency for light within the angle of incidence range is at least one order of magnitude greater than the relative low diffractive efficiency for light within the angle of incidence range.

4. The system of claim 2, wherein the Bragg polarization grating is further configured to:
    cause the zero-order beam to have the one of right handed circular polarization or left handed circular polarization for which the Bragg polarization grating has the relatively high diffractive efficiency; and
    cause the first-order beam to have the one of right handed circular polarization or left handed circular polarization for which the Bragg polarization grating has the relatively low diffractive efficiency.

5. The system of claim 2, wherein the Bragg polarization grating is further configured to:
    cause the zero-order beam to have the one of right handed circular polarization or left handed circular polarization for which the Bragg polarization grating has the relatively low diffractive efficiency; and
    cause the first-order beam to have the one of right handed circular polarization or left handed circular polarization for which the Bragg polarization grating has the relatively high diffractive efficiency.

6. The system of claim 2, wherein the Bragg polarization grating is further configured to reduce a quantity of interference loops that occur within the intermediate-component compared to if the intermediate component was not a Bragg polarization grating configured as specified in claim 2.

7. The system of claim 2, wherein the Bragg polarization grating is further configured to reduce an extent of destructive interference that is caused by interference loops that occur within the intermediate-component compared to if the intermediate component was not a Bragg polarization grating configured as specified in claim 2.

8. The system of claim 2, wherein the Bragg polarization grating is further configured to cause the zero-order and first-order beams to each have an elliptical polarization having an ellipticity angle that changes in dependence on where an optical interaction occurs with the intermediate-component.

9. The system of claim 2, wherein the Bragg polarization grating is further configured to increase polarization diversity of the light corresponding to the image that travels through the optical waveguide from the input-coupler to the output-coupler via the intermediate-component by way of TIR, and thereby provides for a more uniform intensity distribution, compared to if the intermediate component was not configured to diffract the light corresponding to the image that is incident thereon into a zero-order beam having one of right handed circular polarization or left handed circular polarization, and a first-order beam having the other one of right handed circular polarization or left handed circular polarization.

10. The system of claim 1, wherein:
the pupil expansion that the intermediate-component is configured to perform is one of horizontal or vertical pupil expansion; and
the output-coupler is configured to perform the other one of horizontal or vertical pupil expansion.

11. A method comprising:
producing light corresponding to an image;
coupling the light corresponding to the image into an optical waveguide comprising an input-coupler, an intermediate-component, and an output-coupler;
after the light corresponding to the image has been coupled into the optical waveguide, and has traveled within at least a portion of the optical waveguide by way of total internal reflection (TIR), diffracting the light corresponding to the image into a zero-order beam having one of right handed circular polarization or left handed circular polarization, and a first-order beam having the other one of right handed circular polarization or left handed circular polarization;
after the light corresponding to the image has been diffracted into the zero-order beam having the one of right handed circular polarization or left handed circular polarization, and the first-order beam having the other one of right handed circular polarization or left handed circular polarization, coupling at least a portion of the light corresponding to the image out of the optical waveguide; and
implementing the intermediate-component using a stack of birefringent layers that is configured to:
diffract the light corresponding to the image that is incident thereon into the zero-order beam having the one of right handed circular polarization or left handed circular polarization, and the first-order beam having the other one of right handed circular polarization or left handed circular polarization;
have a relatively high diffractive efficiency for light within an angle of incidence range having one of right handed circular polarization or left handed circular polarization; and
have a relatively low diffractive efficiency for light within the angle of incidence range having the other one of right handed circular polarization or left handed circular polarization.

12. The method of claim 11, wherein:
the coupling the light corresponding to the image into optical waveguide is performed using the input-coupler of the optical waveguide;
the diffracting the light corresponding to the image into the zero-order beam having one of right handed circular polarization or left handed circular polarization, and the first-order beam having the other one of right handed circular polarization or left handed circular polarization, is performed using the intermediate-component of the optical waveguide; and
the coupling at least a portion of the light corresponding to the image out of the optical waveguide is performed using the output-coupler of the optical waveguide.

13. The method of claim 12, wherein the intermediate-component is configured to:
have a relatively high diffractive efficiency for light within an angle of incidence range having one of right handed circular polarization or left handed circular polarization; and
have a relatively low diffractive efficiency for light within the angle of incidence range having the other one of right handed circular polarization or left handed circular polarization.

14. The method of claim 12, further comprising:
using the intermediate-component of the optical waveguide to perform one of horizontal or vertical pupil expansion; and
using the output-coupler of the optical waveguide to perform the other one of horizontal or vertical pupil expansion.

15. A system comprising:
an optical waveguide comprising an input-coupler, an intermediate-component, and an output-coupler; and
a display engine configured to produce an image and to direct light corresponding to the image towards the input-coupler of the optical waveguide, wherein:
the input-coupler is configured to couple light corresponding to the image, that is incident on the input-coupler, into the optical waveguide and towards the intermediate-component;
the intermediate-component is configured to perform pupil expansion and direct the light corresponding to the image towards the output-coupler;
the output-coupler is configured to couple, out of the optical waveguide, the light corresponding to the image that travels in the optical waveguide from the input-coupler to the output-coupler via the intermediate-component by way of total internal reflection (TIR); and
the intermediate-component comprises a Bragg polarization grating configured to:
diffract the light corresponding to the image that is incident thereon into a zero-order beam having one of right handed circular polarization or left handed circular polarization, and a first-order beam having the other one of right handed circular polarization or left handed circular polarization;
have a relatively high diffractive efficiency for light within an angle of incidence range having one of right handed circular polarization or left handed circular polarization; and
have a relatively low diffractive efficiency for light within the angle of incidence range having the other one of right handed circular polarization or left handed circular polarization.

16. The system of claim 15, wherein the relatively high diffractive efficiency for light within the angle of incidence range is at least one order of magnitude greater than the relative low diffractive efficiency for light within the angle of incidence range.

17. The system of claim 15, wherein the Bragg polarization grating of the intermediate-component is further configured to:
cause the zero-order beam to have the one of right handed circular polarization or left handed circular polarization for which the Bragg polarization grating has the relatively high diffractive efficiency; and
cause the first-order beam to have the one of right handed circular polarization or left handed circular polarization for which the Bragg polarization grating has the relatively low diffractive efficiency.

18. The system of claim 15, wherein the Bragg polarization grating is further configured to:
cause the zero-order beam to have the one of right handed circular polarization or left handed circular polarization for which the Bragg polarization grating has the relatively low diffractive efficiency; and cause the first-order beam to have the one of right handed circular polarization or left handed circular polarization for which the Bragg polarization grating has the relatively high diffractive efficiency.

19. The system of claim 15, wherein the Bragg polarization grating of the intermediate-component is configured to reduce a quantity of interference loops that occur within the intermediate-component compared to if the intermediate component was not a Bragg polarization grating configured as specified in claim 2.

20. The system of claim 15, wherein the Bragg polarization grating of the intermediate-component is configured to reduce an extent of destructive interference that is caused by interference loops that occur within the intermediate-component compared to if the intermediate component was not a Bragg polarization grating configured as specified in claim 2.

* * * * *